United States Patent
Haverinen

(10) Patent No.: US 9,521,522 B2
(45) Date of Patent: Dec. 13, 2016

(54) MOBILE APPARATUS WITH SEARCH FUNCTION

(71) Applicant: INDOORATLAS OY, Oulu (FI)

(72) Inventor: Janne Haverinen, Kiviniemi (FI)

(73) Assignee: INDOORATLAS OY, Oulu (FI)

( * ) Notice: Subject to any disclaimer, the term of this patent is extended or adjusted under 35 U.S.C. 154(b) by 0 days.

(21) Appl. No.: 14/626,217

(22) Filed: Feb. 19, 2015

(65) Prior Publication Data

US 2016/0249163 A1  Aug. 25, 2016

(51) Int. Cl.
  *H04W 24/00* (2009.01)
  *H04W 4/02* (2009.01)
  *H04W 4/12* (2009.01)
  *G06F 17/27* (2006.01)

(52) U.S. Cl.
  CPC .......... *H04W 4/023* (2013.01); *G06F 17/2765* (2013.01); *H04W 4/12* (2013.01)

(58) Field of Classification Search
  CPC ................................ H04W 4/02; H04W 4/025
  USPC .................................... 455/456.6, 457, 456.3
  See application file for complete search history.

(56) References Cited

U.S. PATENT DOCUMENTS

| | | | |
|---|---|---|---|
| 8,219,115 B1 * | 7/2012 | Nelissen | H04W 4/021 455/414.1 |
| 2010/0257162 A1 | 10/2010 | Buron et al. | |
| 2012/0304087 A1 | 11/2012 | Walkin et al. | |
| 2014/0358724 A1 | 12/2014 | Nallu et al. | |

OTHER PUBLICATIONS

Apr. 26, 2016 International Search Report issued in PCT Application No. PCT/FI2016/050088.
Ana Oliveira et al: "Improving the Quality of Web-GIS Modularity Using Aspects", Quality of Information and Communications Technology (QUATIC), 2010 Seventh International Conference on the, IEEE, Piscataway, NJ, USA, Sep. 29, 2010, pp. 132-141.

* cited by examiner

*Primary Examiner* — Kevin Kim
(74) *Attorney, Agent, or Firm* — Oliff PLC

(57) ABSTRACT

A mobile apparatus, a computer program for a mobile apparatus, and a method in a mobile apparatus. A string is obtained. A location associated with the string is obtained. Then, a location-based search for location-dependent data is performed on the basis of the location and one or more independent expressions within the string such that the location-dependent data is relevant within a predetermined distance from the location. Finally, at least a part of the location-dependent data is displayed on a map.

82 Claims, 10 Drawing Sheets

MOBILE APPARATUS WITH SEARCH FUNCTION

FIELD

The invention relates to a mobile apparatus, a non-transitory computer-readable storage medium comprising a computer program for a mobile apparatus, and a method in a mobile apparatus.

BACKGROUND

The Internet includes a vast amount of information. The problem lies in finding easily and effectively a reasonable amount of relevant information. Various search engines are commonly used for searching the Internet. However, the search function still needs further sophistication

BRIEF DESCRIPTION

The present invention seeks to provide an improved mobile apparatus, an improved computer program, and an improved method.

According to an aspect of the present invention, there is provided a mobile apparatus comprising: a display; one or more processors; and one or more memories including computer program code; the one or more memories and the computer program code configured to, with the one or more processors, cause the mobile apparatus at least to: obtain a string; obtain a location associated with the string; perform a location-based search for location-dependent data on the basis of the location and one or more independent expressions within the string such that the location-dependent data is relevant within a predetermined distance from the location; and display at least a part of the location-dependent data on a map on the display.

According to another aspect of the present invention, there is provided a non-transitory computer-readable storage medium comprising a computer program comprising computer program code which, when loaded into a mobile apparatus causes the mobile apparatus to perform: obtain a string; obtain a location associated with the string; perform a location-based search for location-dependent data on the basis of the location and one or more independent expressions within the string such that the location-dependent data is relevant within a predetermined distance from the location; and display at least a part of the location-dependent data on a map.

According to another aspect of the present invention, there is provided a method in a mobile apparatus comprising: obtaining a string; obtaining a location associated with the string; performing a location-based search for location-dependent data on the basis of the location and one or more independent expressions within the string such that the location-dependent data is relevant within a predetermined distance from the location; and displaying at least a part of the location-dependent data on a map.

The invention may provide at least some of the following advantages: independent expressions may form a basis for more than one simultaneous search, the search condition may be made more complicated, it may be easier to find the relevant information, and the search may be limited such that the search is more effective, but it still provides more relevant information.

LIST OF DRAWINGS

Figure 1:
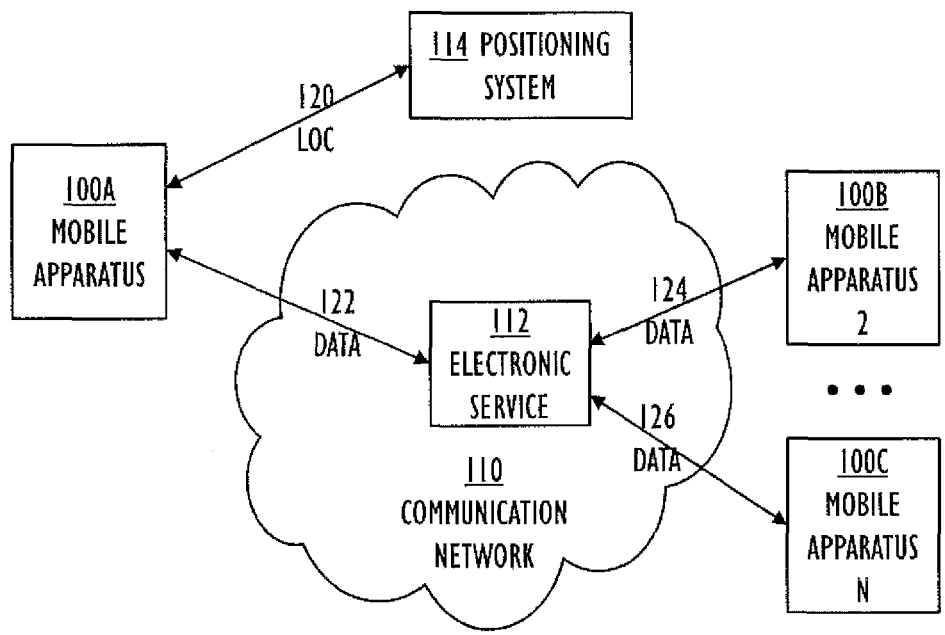
Figure 2:
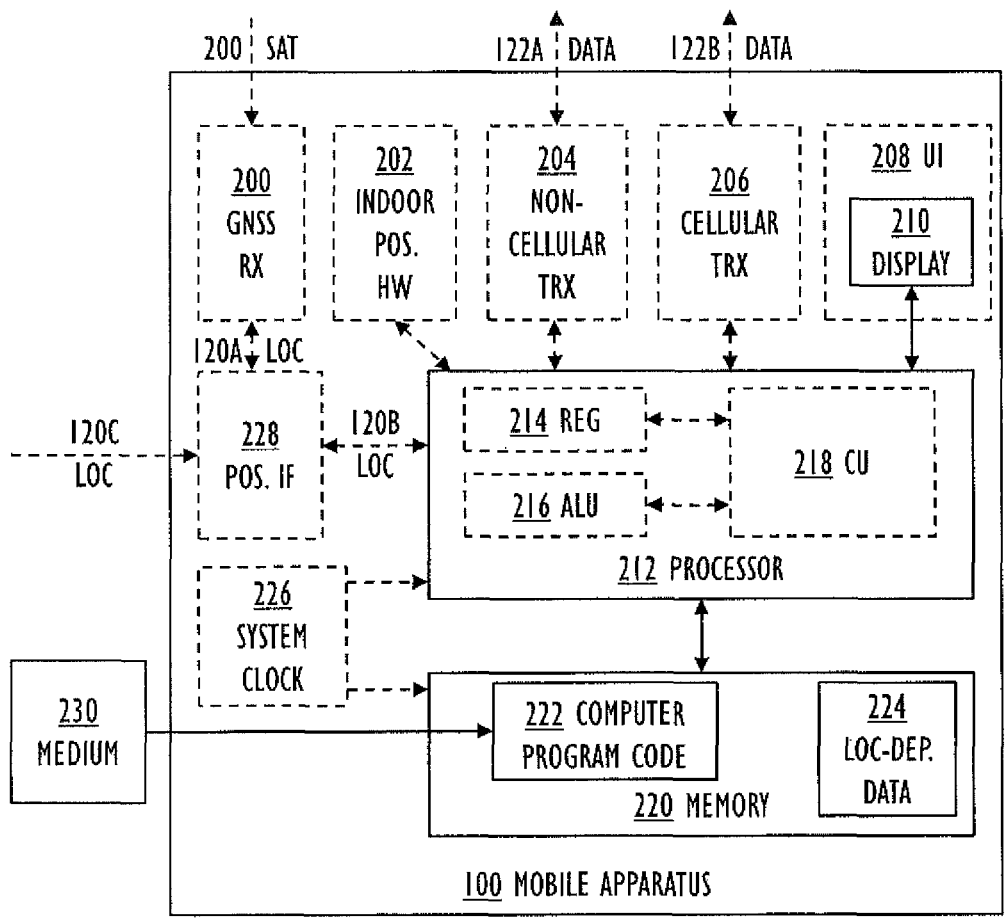
Figure 3:
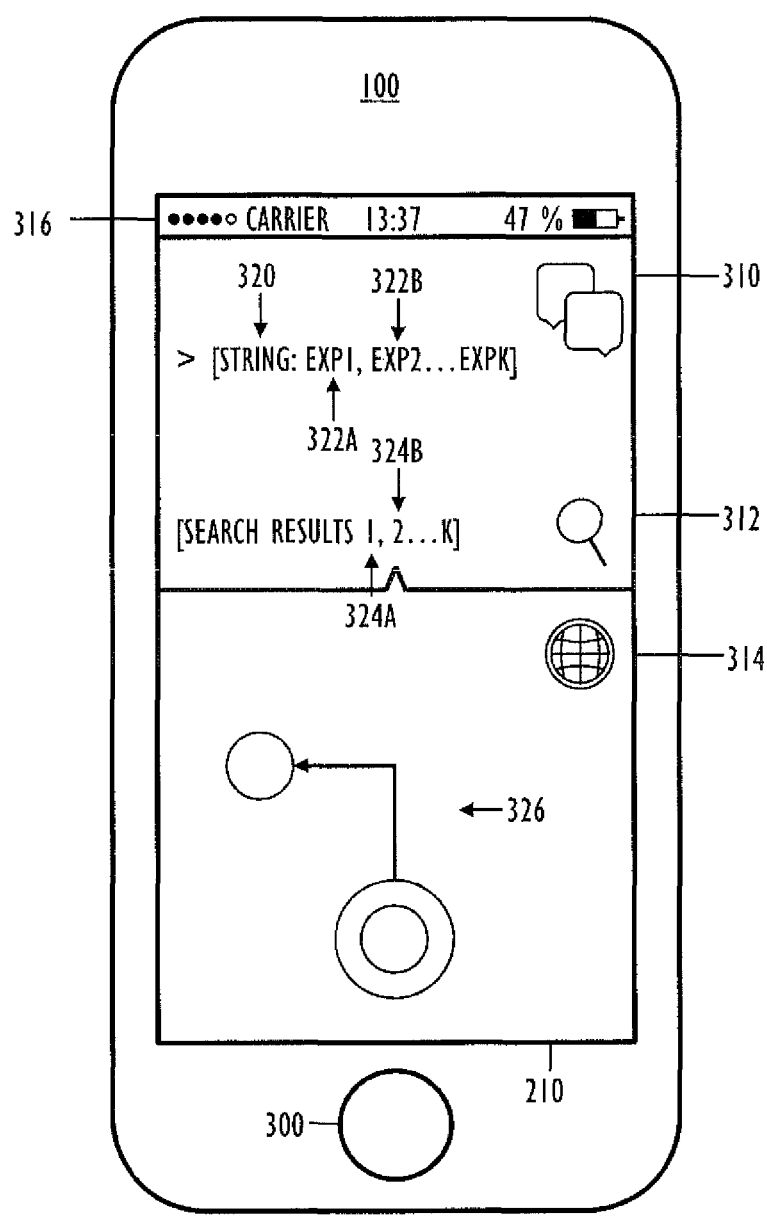
Figure 9:
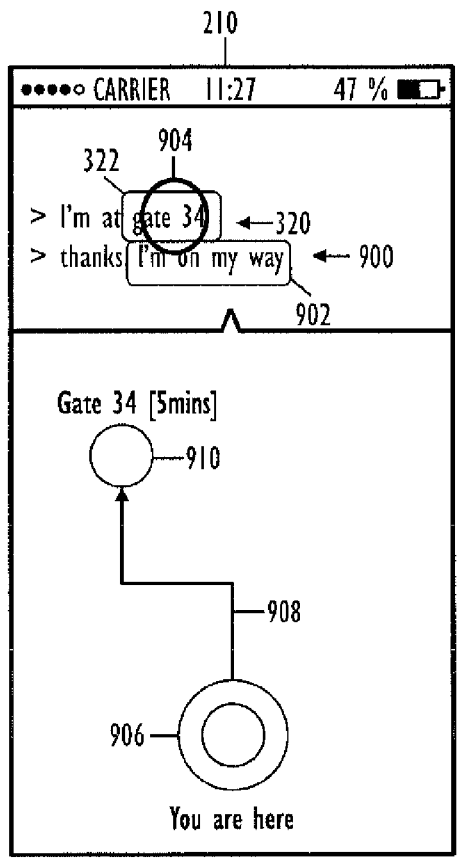
Figure 10:
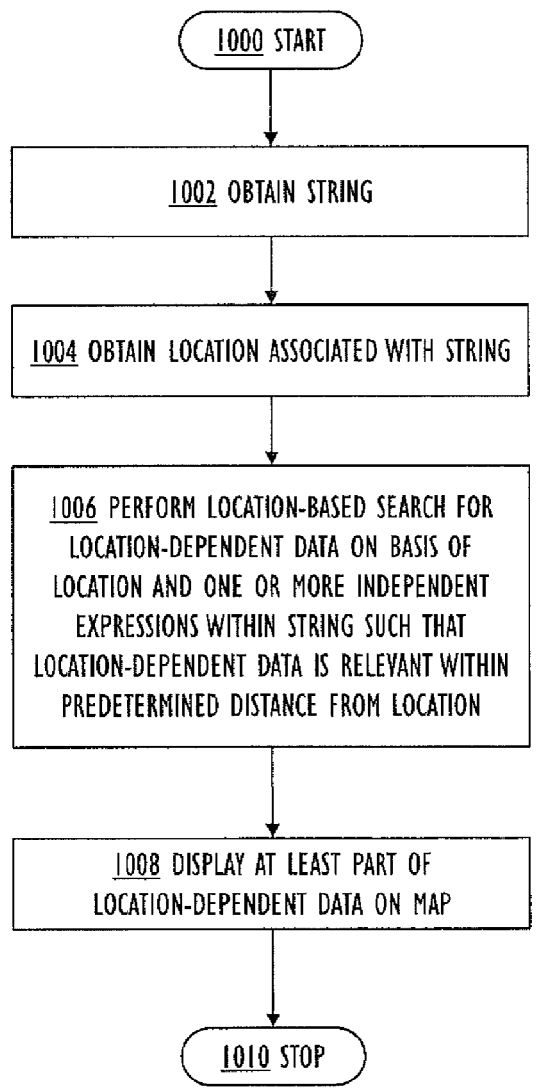

Example embodiments of the present invention are described below, by way of example only, with reference to the accompanying drawings, in which FIGS. 1, 2 and 3 illustrate example embodiments of a mobile apparatus and its general operating environment;

FIGS. 4A, 4B, 4C, 4D, 5A, 5B, 5C, 5D, 5E, 5F, 6A, 6B, 7, 8 and 9 illustrate various example embodiments of location-based searches with the mobile apparatus; and FIG. 10 is a flow chart illustrating example embodiments of a method performed in the mobile apparatus.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the mobile apparatuses have been depicted as separate single entities, different parts may be implemented in one or more physical or logical entities.

FIG. 1 illustrates example embodiments of a mobile apparatus 100 and its general operating environment. The mobile apparatus 100A may communicate 122 with an electronic service 112 through a communication network 110. In an example embodiment, the mobile apparatus 100A may interact 120 with a positioning system 114. Other mobile apparatuses 100B, 100C may also communicate 124, 126 with the electronic service 112. The number of the mobile apparatuses 100A, 1008, 100C may vary from 1 to N, wherein N is any integer greater than one.

In an example embodiment, the mobile apparatus 100 is a portable electronic communication apparatus. A non-exhaustive list of the types of the mobile apparatus 100 includes: a mobile phone, a smartphone, a tablet computer, a phablet, a smartwatch, a general-purpose mobile computing device. In an example embodiment, the mobile apparatus 100 is a general-purpose off-the-shelf computing device, as opposed to a purpose-build proprietary equipment, whereby research & development costs will be lower as only the special-purpose software (and not the hardware) needs to be designed, implemented and tested. In FIG. 3, an example embodiment of the mobile apparatus 100 is illustrated: the mobile apparatus 100 is a smartphone or a tablet employing a multi-touch display 400. Such devices may employ a suitable operating system such as iOS, Android, or Windows Phone, for example.

In an example embodiment, the electronic service 112 may be implemented by a suitable computing resource or a combination of various computing resources.

In an example embodiment, the computing resource 112 may be implemented as a single server computer or as a cluster of computers. The server is a part of the client-server computing model that acts as distributed application which partitions tasks or workloads between the provider of a resource or service, called server, and the service requester, called client. The server 112 may serve a number of mobile apparatuses 100. The server computer 112 may be a host that is running one or more server programs which share their resources with clients 100. The client 100 may request a service function (a search) or content (search results) from the server 112. Also, the client 100 may initiate a communication session with the server 112 which awaits incoming requests.

In an example embodiment, the electronic service 112 may also operate according to the cloud computing model, at least in part. Naturally, besides these example embodiments of the electronic service 112, other feasible computing architectures may be utilized as well to implement the hardware and software of the electronic service 112. Consequently, besides operating according to the client/server architecture, push technology may be utilized as well. In push technology, the request for a transaction is initiated by the electronic service 112, whereas with the pull technology the request for the information is initiated by the client 100.

In an example embodiment, ss standard/non-standard/proprietary communication network, whichthe communication network 110 comprises at least one wirele is coupled with a wired network such as the Internet.

In an example embodiment, the wireless communication network 110 comprises any mobile phone network, regardless of the generation (such as 2G, 3G, 4G, beyond 4G, 5G etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), Mobile WiMAX, and other radio systems (in their present forms and/or in their evolution forms).

In an example embodiment, the communication network supports the use of subscriber identity module (SIM), which may be an integrated circuit storing subscriber data, which is network-specific information used to authenticate and identify the subscriber on the cellular network. The subscriber identity module may be embedded into a removable SIM card. Consequently, the mobile apparatus 100 may include the SIM card (and a SIM card reader). Alternatively, the mobile apparatus 100 may include a virtual or software SIM card.

In an example embodiment, the wireless communication network 110 comprises a wireless local area network (WLAN), a hotspot, or an access point, all of which may provide Internet access through the use of a router connected to a link to an Internet service provider.

In an example embodiment, the positioning system 114 may comprise a global navigation satellite system (GNSS) such as GPS (Global Positioning System) of the USA, Galileo of the European Union, GLONASS of Russia, Beidou of China, or IRNSS of India. Besides GNSS, or instead of GNSS, other location techniques may be utilizes as well such as those developed for use in cellular radio networks.

In an example embodiment, the positioning system 114 comprises an indoor positioning system. In an example embodiment, the indoor positioning system 114 comprises a magnetic positioning system as developed by the Applicant, IndoorAtlas, and disclosed in its various patents/applications, incorporated herein by reference: U.S. Pat. No. 8,798, 924, Ser. Nos. 13/733,439, 14/299,582, 13/927,854, 13/859, 944, 14/606,358, 13/739,640, 13/871,612, 13/905,655, 13/915,016, 14/054,264, 14/093,250, 14/207,916, and 14/524,420. In an example embodiment, the indoor positioning system 114 comprises other applicable techniques, besides, or in addition to, the magnetic positioning system, such as at least one of a hybrid positioning technology, Wi-Fi-based positioning, WLAN-based positioning, indoor base station-based positioning, IP address-based positioning, and mobile apparatus sensor fusion-based positioning, FIG. 2 illustrates further example embodiments of the mobile apparatus 100. The mobile apparatus 100 comprises a display 210, one or more processors 212, and one or more memories 220 including computer program code 222.

In an example embodiment, the display 210 is implemented by an appropriate technology, such as a liquid crystal display (LCD), a thin-film transistor (TFT) display, a light-emitting diode (LED) display, an organic LED (OLED) display, an electroluminescent display (ELD), or an electronic paper (or e-paper or electronic ink) display, for example. The display may also incorporate other user interaction means, such as touch input, or haptic feedback, i.e. the display may be a multi-touch display 210 as illustrated in FIG. 3.

In an example embodiment, the display 210 is a part of the user interface 208 implementing the exchange of graphical, textual and auditory information with a user. The user interface 208 may be realized with various techniques, such as the display 210, means for producing sound, a keyboard, and/or a keypad, for example. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 208 may comprise other user interface components, for example various means for focusing a cursor (mouse, track ball, arrow keys, touch sensitive area etc.) or elements enabling audio control.

In an example embodiment, the mobile apparatus 100 further comprises a positioning interface 228 configured to obtain an own location of the mobile apparatus 100 from the positioning system 114. As illustrated in FIG. 2, the positioning interface 228 may obtain the location data 120A, 120B, 120C from various sources.

In an example embodiment, the mobile apparatus 100 comprises a GNSS receiver 200, which generates the location data 120A on the basis of signals 200 received from Earth-orbiting satellites.

In an example embodiment, the mobile apparatus 100 comprises indoor positioning hardware (and software), which generates the location data 1208. The indoor positioning hardware may comprise a magnetometer to measure variations in the magnetic field of the Earth caused by building structures (especially by steel-reinforced concrete). Furthermore, in some cases, the indoor positioning hardware may comprise an acceleration sensor (measuring in one, two or three dimensions) and/or a gyroscope, for example.

In an example embodiment, the mobile apparatus 100 comprises a cellular radio transceiver 206 and/or a non-cellular radio transceiver 204. The positioning interface 228 may obtain the location data 1208 as obtained/generated on the basis of the wireless communication 122A, 122B utilizing the transceivers 204 and/or 206.

In an example embodiment, the cellular radio transceiver 206 may be interoperable with the already-mentioned various wireless standard/non-standard/proprietary cellular communication networks such as any mobile phone network.

In an example embodiment, the non-cellular radio transceiver 204 may utilize a short-range radio transceiver such as a Bluetooth, Bluetooth low energy (BLE), Wi-Fi (or WiFi) or other WLAN transceiver (based on IEEE (Institute of Electrical and Electronics Engineers) 802.11 standard or its evolution versions (IEEE 802.11ac etc.), for example).

The positioning interface 228 may also obtain the location data 120C with some other means. In an example embodiment, the mobile apparatus 100 may comprise a radio frequency identification (RFID) reader configured to read the location data 120C from an RFID tag attached fixedly to a known location. In an example embodiment, the mobile apparatus 100 comprises a camera, and the location data 120C may be obtained by photographing a machine readable code (such as a barcode or a QR code) attached fixedly to a known location or by photographing or recording video (from a floor, walls and/or ceiling) and identifying the location from identified unique features.

The term 'processor' 212 refers to a device that is capable of processing data. Depending on the processing power needed, the mobile apparatus 100 may comprise several processors 212 such as parallel processors or a multicore processor. When designing the implementation of the processor 212, a person skilled in the art will consider the requirements set for the size and power consumption of the mobile apparatus 100, the necessary processing capacity, production costs, and production volumes, for example. The processor 212 and the memory 220 may be implemented by an electronic circuitry.

The term 'memory' 220 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

In an example embodiment, a system clock 226 constantly generates a stream of electrical pulses, which cause the various transferring operations within the mobile apparatus 100 to take place in an orderly manner and with specific timing.

In an example embodiment, the processor 212 may be implemented as a microprocessor implementing functions of a central processing unit (CPU) on an integrated circuit. The CPU is a logic machine executing a computer program code 222. The computer program code 222 may be coded as a computer program using a programming language, which may be a high-level programming language, such as C, C++, or Java, or a low-level programming language, such as a machine language, or an assembler, for example. The CPU may comprise a set of registers 214, an arithmetic logic unit (ALU) 216, and a control unit (CU) 218. The control unit 218 is controlled by a sequence of the computer program code 222 transferred to the CPU from the (working) memory 220. The control unit 218 may contain a number of microinstructions for basic operations. The implementation of the microinstructions may vary, depending on the CPU design. The microprocessor 212 may also have an operating system (a dedicated operating system of an embedded system, a real-time operating system, or even a general-purpose operating system), which may provide the computer program code 222 with system services.

A non-exhaustive list of implementation techniques for the processor 212 and the memory 220 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 222 may be implemented by software and/or hardware. In an example embodiment, the software may be written by a suitable programming language, and the resulting executable code 222 may be stored on the memory 220 and run by the processor 212.

In an example embodiment, the functionality of the hardware may be designed by a suitable hardware description language (such as Verilog or VHDL), and transformed into a gate-level netlist (describing standard cells and the electrical connections between them), and after further phases the chip implementing the processor 212, memory 220 and the code 222 of the mobile apparatus 100 may be fabricated with photo masks describing the circuitry.

In an example embodiment, the processor 212 and the memory 220 are separate entities, communicatively coupled together by an appropriate serial bus, for example. In general interfaces between the various elements may be implemented with suitable interface technologies, such as a message interface, a method interface, a sub-routine call interface, a block interface, an appropriate serial/parallel bus, or any hardware/software means enabling communication between various sub-units of the mobile apparatus 100.

An example embodiment provides a computer-readable medium 230 comprising a computer program comprising the computer program code 222 which, when loaded into the mobile apparatus 100 causes the mobile apparatus 100 to perform: obtain a string; obtain a location associated with the string; perform a location-based search for location-dependent data on the basis of the location and one or more independent expressions within the string such that the location-dependent data is relevant within a predetermined distance from the location; and display at least a part of the location-dependent data on a map.

The example embodiments of the mobile apparatus 100 may be used to enhance the operation of the computer program code 222. There are many ways to structure the computer program code 222. In an example embodiment, the operations of the computer program code 222 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 222 for performing a wide variety of standard operations. In an example embodiment, the computer program code 222 may be in source code form, object code form, executable file, or in some intermediate form. The computer-readable medium 230 may comprise at least the following: any entity or device capable of carrying computer program code 222 to the mobile apparatus 100, a record medium, a computer memory, a read-only memory, an electrical carrier signal, a telecommunications signal, and a software distribution medium. In some jurisdictions, depending on the legislation and the patent practice, the computer-readable medium 230 may not be the telecommunications signal. In an example embodiment, the computer-readable medium 230 may be a non-transitory computer-readable storage medium.

Naturally, the mobile apparatus 100 may include various other parts, such as a battery, a camera, or a radio-frequency identifier reader, but as they are not needed to further illustrate the example embodiments, they will not be further described.

Now that the basic structures of the mobile apparatus 100 have been described, we may proceed in describing the operation of the mobile apparatus 100 in more detail with reference to FIG. 3 giving a more detailed view of the functionality, and FIGS. 4A, 4B, 4C, 4D, 5A, 5B, 5C, 5D, 5E, 5F, 6A, 6B, 7, 8 and 9 illustrating various example embodiments of location-based searches with the mobile apparatus 100.

The one or more memories 220 and the computer program code 222 are configured to, with the one or more processors 212, cause the mobile apparatus 100 to obtain a string 320.

In an example embodiment, the string 320 comprises free-form written text, which realizes a medium of communication, which represents a language through the inscription of signs and symbols.

In an example embodiment, the string 320 comprises one or more expressions 322A, 322B. The number of the expressions 322A, 322B may vary from 1 to K, wherein K is any integer greater than one (naturally within the search processing capacity).

In an example embodiment, the expression 322A, 322B realizes a thought communicated by the language.

In an example embodiment, the expression 322A, 322B comprises one or more words, which are selected from a predetermined vocabulary. In an example embodiment, the one or more words are organized according to a grammar, and define a semantic meaning. Consequently, the expression 322 is recognized by recognizing one or more known words from the vocabulary. In further analyzing the expression 322, the grammar may provide rules according to which the expression 322 is interpreted. Also the analysis of the semantic meaning may be required.

In an example embodiment, the predetermined vocabulary is defined as a set or a subset of one or more languages.

In an example embodiment, the string 320 comprises a sequence of characters. The characters may include alphabets, numerals and special characters. In an example embodiment, the characters are based on ASCII or EBCDIC. Even though our example embodiments utilize Latin alphabets, the example embodiments are applicable with other alphabets (Russian, Greek, Hebrew, Arabic etc.) and also with logographic languages (Chinese, Japanese, Korean etc.), which utilize more complex characters (such as kanji).

In an example embodiment, the one or more memories 220 and the computer program code 222 are configured to, with the one or more processors 212, cause the mobile apparatus 100 further to obtain the string 320 from free-form text displayed on the display 210. In an example embodiment, the one or more memories 220 and the computer program code 222 are configured to, with the one or more processors 212, cause the mobile apparatus 100 further to obtain the location associated with the string 320 from the free-form text.

In an example embodiment, the one or more memories 220 and the computer program code 222 are configured to, with the one or more processors 212, cause the mobile apparatus 100 further to obtain the string 320 from free-form text displayed in a messaging interface on the display 210.

In an example embodiment, the one or more memories 220 and the computer program code 222 are configured to, with the one or more processors 212, cause the mobile apparatus 100 further to obtain a location of another mobile apparatus 100B, which is either a sender or a recipient in the messaging interface, as the location associated with the string 320.

In an example embodiment (see FIG. 7), the one or more memories 220 and the computer program code 222 are configured to, with the one or more processors 212, cause the mobile apparatus 100 further to obtain the string 320 from a calendar event (such as an invitation, appointment or meeting) displayed on the display 210. In an example embodiment, the one or more memories 220 and the computer program code 222 are configured to, with the one or more processors 212, cause the mobile apparatus 100 further to obtain a location defined in the calendar event as the location associated with the string 320. Other fields of the calendar event may also be utilized to refine the location-based search: subject, start time and end time, for example. In a typical use case: the user receives a calendar invitation, and the location of the meeting room is displayed for the user, possibly with route instructions. Furthermore, on the basis of the start time and end time, locations and lunch lists of nearby restaurants may be searched for and the resulting location-dependent data displayed on the display 210.

In an example embodiment, the one or more memories 220 and the computer program code 222 are configured to, with the one or more processors 212, cause the mobile apparatus 100 further to obtain the string 320 from the free-form text received with the wireless transceiver 204 and/or 206.

In an example embodiment, the one or more memories 220 and the computer program code 222 are configured to, with the one or more processors 212, cause the mobile apparatus 100 further to obtain the string 320 from the free-form text mined from at least one of the following residing in the memory 220: a text file, an image file, a video file, an audio file, a reference to a text file, a reference to an image file, a reference to a video file, a reference to an audio file. Image, video and audio files may be analyzed with appropriate speech recognition and machine vision (or pattern analysis) programs in order to generate the string 320.

In an example embodiment, the string 320 comprises at least one of the following elements residing in the memory 220: an image file, a video file, an audio file, a reference to an image file, a reference to a video file, a reference to an audio file, and the one or more memories 220 and the computer program code 222 are configured to, with the one or more processors 212, cause the mobile apparatus 100 further to recognize one or more digital objects within the one or more elements as the independent expressions 322A, 322B, and perform the location-based search such that a pattern recognition search for the one or more digital objects forms at least a part of the location-based search. The pattern recognition is based on recognition of patterns and regularities in data. For videos and images, computer vision technologies may form a part of the pattern recognition. The string 320 may thus comprise an image file, a video file, or an audio file, whereby the expression 322A may be a part of the image/video/audio file. The string 320 may also, additionally, or alternatively, comprise a reference to an image file, a reference to a video file, a reference to an audio file, whereby the expression 322A may be a part of the image/video/audio file dereferenced by the reference. In an example embodiment, the string 320 only contains computer-generated expressions, which determine a reference (a pointer to a file, or a definition of a storage location of a file, for example) to an image file, a video file, an audio file, or to some other type of a media file.

A typical use case: a woman communicates with her mobile apparatus 100B to a mobile apparatus of a man that she needs a makeup set shown in the attached image. The location of the man is obtained, and a location-based search is performed: which shops in the nearby sell makeup sets, and, a further search may be made in order to match the image of the makeup set, whereupon information about availability, prices etc. may be shown as the location-dependent data in the mobile apparatus 100A of the man. In an example embodiment, the location-based search may be multi-staged: the first search may give as a result a number of databases (such as product databases of various shops), which are within the predetermined distance, whereupon in the second search the found databases are searched (with product definitions, for example).

The one or more memories 220 and the computer program code 222 are configured to, with the one or more processors 212, cause the mobile apparatus 100 further to obtain, with the positioning interface 228, an own location of the mobile apparatus 100 as the location associated with the string 320. The own location may be expressed as geographic coordinates, or as a location on a map (on an indoor map, for example).

In an example embodiment, the one or more memories 220 and the computer program code 222 are configured to, with the one or more processors 212, cause the mobile apparatus 100 further to obtain at least one other location of at least one other mobile apparatus 100B, 100C, and generate the location associated with the string 320 on the basis of the own location and the at least one other location.

In an example embodiment, the one or more memories 220 and the computer program code 222 are configured to, with the one or more processors 212, cause the mobile apparatus 100 further to perform the location-based search by one of such that the location-dependent data is relevant within the predetermined distance from the own location or from the at least one other location, or such that the location-dependent data is relevant within the predetermined distance from a combined area defined by the own location and the at least one other location. In this example embodiment, the location associated with the string 320 is thus the locations of the mobile apparatuses 100A, 100B, 100C as separate areas or as the combined area formed from the locations of the mobile apparatuses 100A, 100B, 100C. For example, let us suppose that there are two mobile apparatuses 100A, 1008, and the mobile apparatus 100A is in district A of city Z, and the mobile apparatus 1008 is in district B of city Z. Now, the locations are district A and district B, or a combined area consisting of districts A, B and ID, wherein D is a district between districts A and B.

The one or more memories 220 and the computer program code 222 are configured to, with the one or more processors 212, cause the mobile apparatus 100 further to perform a location-based search for location-dependent data 324A, 324B on the basis of the own location and one or more independent expressions 322A, 322B within the string 320 such that the location-dependent data 324A, 324B is relevant within a predetermined distance from the own location. The predetermined distance may be defined in meters, kilometers, yards, or miles, for example. The distance may be expressed in relation to some geometric shape, such as a radius of a circle, for example. Alternatively, the predetermined distance may be determined as inside or in a vicinity of a specific building or building complex such as in a shop or in a mall.

The location-based search may actually be executed either in the mobile apparatus 100 or in the electronic service 112. The actual execution of the location-based search may also be divided between the mobile apparatus 100 and the electronic service 112.

Consequently, in an example embodiment, the one or more memories 220 and the computer program code 222 are configured to, with the one or more processors 212, cause the mobile apparatus 100 further to perform at least a part of the location-based search by communicating with the external electronic service 112 through the wireless transceiver 204 and/or 206. In another example embodiment, the one or more memories 220 and the computer program code 222 are configured to, with the one or more processors 212, cause the mobile apparatus 100 further to perform at least a part of the location-based search by interacting with a database 224 stored in the memory 220.

In an example embodiment, the mobile apparatus 100 further comprises a database 224, which comprises expression-data-pairs, and the one or more memories 220 and the computer program code 222 are configured to, with the one or more processors 212, cause the mobile apparatus 100 further to perform the location-based search by searching the database 224 iteratively with each expression.

In an example embodiment, the one or more memories 220 and the computer program code 222 are configured to, with the one or more processors 212, cause the mobile apparatus 100 further to display at least a part of the location-dependent data 324A, 324B on a map 326 on the display 210.

The described sequence of four operations—obtain string, obtain location, perform location-based search, and display location-dependent data—implements a novel and effective search engine. The search engine combines messaging and a dynamic, location-sensitive expression search. The natural language search input couples, the first time in the world, messaging and real-time (or near real-time) expression search, offering end users a natural way to find, explore, and share things, brands, services, and products around them. A crowdsourcing feature may guarantee the availability of the most up-to-date and the most comprehensive search database.

In an example embodiment, the main three elements of the search engine app are:

1. Messaging 310. Users can send and receive free form messages to/from other users. The messaging 310 may be built on top of existing messaging apps, APIs, or open source solutions. As examples of the existing messaging applications or technologies, the following list is given: SMS (Short Message Service, MMS (Multimedia Message Service), e-mail, IRC (Internet Relay Chat), Slack, Skype, Instagram, QQ, WhatsApp, Facebook Messenger, WeChat, Snapchat, LINE.

2. Search 312. The messaging interface 320 acts as a dynamic search bar. Based on the location (e.g. mall, store, office, campus, conference venue), the search engine performs location-based searches to free form expressions on the search bar: location-based search becomes an integral and dynamic part of the messaging 310.

3. Maps 314. The user may use the map interface 314 to check the locations associated with the expressions recognized by the search engine, and to associate new unrecognized expressions to correct map locations. This may be done, e.g., by dragging and dropping new expressions to correct map locations. The map interface 314 may also offer path planning and way-finding features.

In an example embodiment, the independent expressions 322A, 322B are independent such that each expression 322A, 322B causes an own location-based search, with own results 324A, 324B for each search.

FIGS. 4A, 4B, 40 and 4D illustrate an example embodiment related to a free-form shopping list.

Figure 4A:
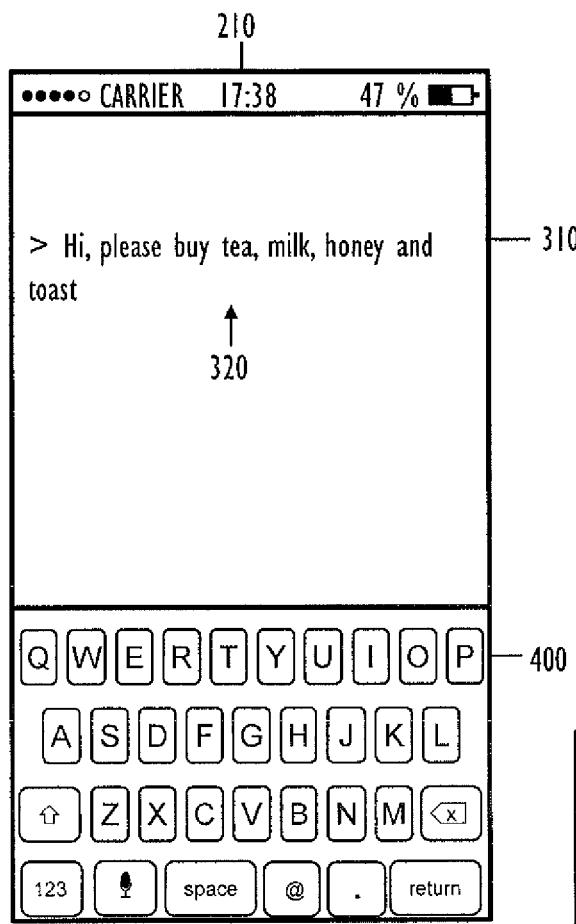

In FIG. 4A, a shopping list (=string) 320 is received by the messaging component. A virtual keyboard 400 is also visible for possible user interaction.

Figure 4B:
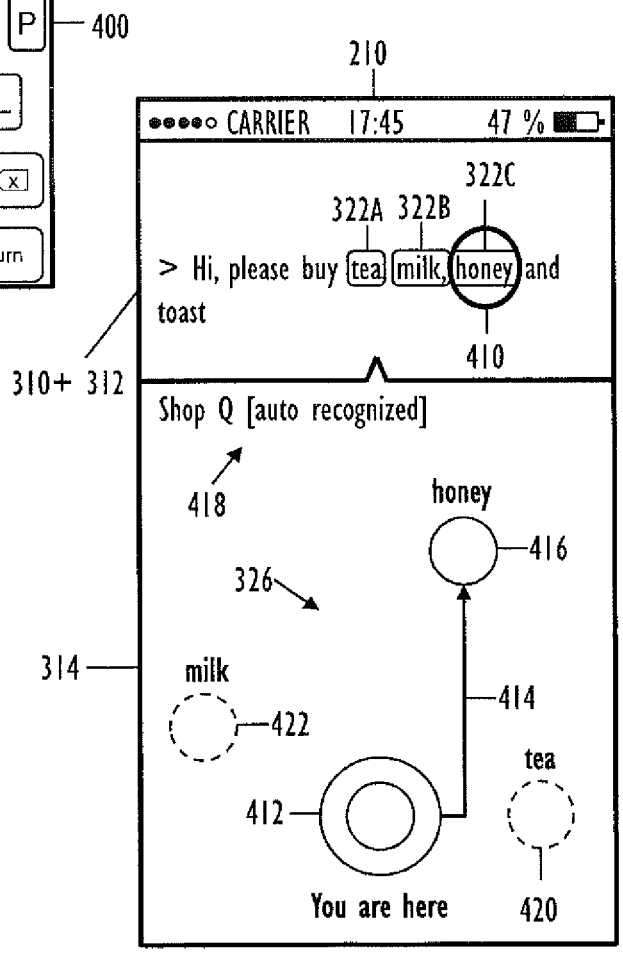

In FIG. 4B, the three expressions 322A, 322B, 322C have been recognized within the string 320: "tea", "milk" and "honey".

In an example embodiment of FIG. 4B, the messaging interface 310 simultaneously acts as a search interface 312, such that the combined messaging and search interface 310+312 is displayed on the display 210. Such a user interface element 310+312 is very powerful enabling improved ease of use.

In fact, also such an example embodiment is feasible, wherein the combined messaging and search interface 310+312 is utilized for a simple search, i.e. without the search being location-based. In such a case, the one or more memories 220 and the computer program code 222 are configured to, with the one or more processors 212, cause the mobile apparatus 100 to implement the following sequence: obtain the string 320 and perform a search for data on the basis of one or more independent expressions 322A, 322B within the string 320 in a combined messaging and search interface 310+312, and display at least a part of the data 324A, 324 on a map 326 on the display 210. This example embodiment may be augmented by the other disclosed example embodiments by taking out the location-based nature of the search.

For example, in an example embodiment illustrated in FIG. 4B, the simple search may be implemented as follows: the one or more memories 220 and the computer program code 222 are configured to, with the one or more processors 212, cause the mobile apparatus 100 further, after displaying the string 320 such that the one or more independent expressions 322A, 322B, 322C become distinguishable within the string 320, to receive a user selection 410 of at least one of the one or more independent expressions 322C, and perform the search on the basis of the user selection (for "honey" in our example) 410. Alternatively, this may be implemented such that the one or more memories 220 and the computer program code 222 are configured to, with the one or more processors 212, cause the mobile apparatus 100 further, after obtaining the string 320, receive a user selection 410 of the one or more independent expressions 322C displayed on the display 210, and perform the search on the basis of the user selection 410.

The expressions 322A, 322B, 322C may be recognized within the string 320 by at least three different example embodiments, depending on whether the recognition is made after obtaining the string, before performing the location-based search, or as a part of the location-based search.

In the first example embodiment, the one or more memories 220 and the computer program code 222 are configured to, with the one or more processors 212, cause the mobile apparatus 100 further, after obtaining the string 320, to recognize automatically the one or more independent expressions 322A, 322B, 322C within the string 320.

In the second example embodiment, the one or more memories 220 and the computer program code 222 are configured to, with the one or more processors 212, cause the mobile apparatus 100 further to recognize automatically the one or more independent expressions 322A, 322B, 322C within the string 320 before performing the location-based search.

In the third example embodiment, the one or more memories 220 and the computer program code 222 are configured to, with the one or more processors 212, cause the mobile apparatus 100 further to recognize automatically the one or more independent expressions 322A, 322B, 322C within the string 320 as a part of the location-based search.

In the example embodiment of FIG. 4B, the three expressions 322A, 322B, 322C may have been recognized after obtaining the string 320, before performing the location-based search, or as a part of the location-based search.

FIG. 4B also illustrates an example embodiment, wherein the one or more memories 220 and the computer program code 222 are configured to, with the one or more processors 212, cause the mobile apparatus 100 further to display the location-dependent data on the map 326 on the display 210 such that for each location-based search the location-dependent data is displayed by one of displaying the location-dependent data simultaneously for each location-based search, displaying the location-dependent data for each location-based search as selected by a user interaction. In our example embodiment of FIG. 4B, the location dependent-data is displayed as selected by user interaction: the user taps 410 "honey" 322C, whereupon a location 416 of the honey is displayed on the map 326 according to the location-dependent data (which included the location of the honey). Alternatively, or additionally, the location-dependent data may be displayed simultaneously for each location-based search: the locations 420, 422 of the tea and milk are also displayed together with the location 416 of the honey.

FIG. 4B also illustrates an example embodiment, wherein the positioning interface 228 comprises an interface to an indoor positioning system 114 as was explained earlier. The one or more memories 220 and the computer program code 222 are configured to, with the one or more processors 212, cause the mobile apparatus 100 further to perform the location-based search such that the location-dependent data 324A, 324B is associated with indoor locations comprising buildings. As shown in FIG. 4B, the indoor location is recognized as "Shop Q" 418. The predetermined distance may define a building, a part of the building, a wing of the building, a certain floor or floors of the building, for example.

FIGS. 2 and 4B also illustrate an example embodiment, wherein the mobile apparatus 100 further comprises a database 224, whose contents are classified into location classes, and the one or more memories 220 and the computer program code 222 are configured to, with the one or more processors 212, cause the mobile apparatus 100 further to select a subset of the database 224 such that location classes correspond to the own location, Shop Q 418, and perform the location-based search for the subset of the database 224 with the one or more independent expressions 322A, 322B, 322C. In our example embodiment, the location-based search becomes very effective as "tea" 322A, "milk" 322B and "honey" 322C only need to be searched for Shop Q 418, i.e. the location-dependent data 416 is relevant within the predetermined distance from the own location 412, wherein the predetermined distance in this case may be interpreted as "within Shop Q". Naturally, as the locations for "tea", "milk" and "honey" may vary shop-by-shop, only the location-based search produces location-dependent data, which may be shown on the correct map 326 (determined by the associated location).

FIG. 4B also illustrates an example embodiment, wherein the one or more memories 220 and the computer program code 222 are configured to, with the one or more processors 212, cause the mobile apparatus 100 further to display the own location 412 on the map 326 on the display 210, and display a route 414 between the own location 412 and a location 416 associated with the location-dependent data (=location of honey) on the map 326 on the display 210. This example embodiment may be augmented by providing navigation help, such as giving instructions on the display 210 or with voice about distances, turns etc. that help the user to follow the route 414.

FIG. 4B also illustrates an example embodiment, wherein the one or more memories 220 and the computer program code 222 are configured to, with the one or more processors 212, cause the mobile apparatus 100 further to display the location-dependent data 416 relating to the expression 322C on the map 326 and the expression 322C simultaneously on the display 210.

FIG. 4B also illustrates an example embodiment, wherein the one or more memories 220 and the computer program code 222 are configured to, with the one or more processors 212, cause the mobile apparatus 100 further, after recognizing the one or more expressions 322A, 322B, 322C within the string 320, to display the string 320 such that the one or more independent expressions 322A, 322B, 322C become distinguishable within the string 320. In our example embodiment, the expressions "tea" 322A, "milk" 322B and "honey" 322C may be made distinguishable by various ways: bolding the text, underlining the text, changing the color of the text, changing the font of the text, changing the size of the text, placing an appropriate symbol by the text, placing an appropriate symbol by a logo or image related to the text etc.

FIG. 4B also illustrates an example embodiment, wherein the one or more memories 220 and the computer program code 222 are configured to, with the one or more processors 212, cause the mobile apparatus 100 further, after displaying the string 320 such that the one or more independent expressions 322A, 322B, 322C become distinguishable within the string 320, to receive a user selection of at least one of the one or more independent expressions 322A/322B/322C, and perform the location-based search on the basis of the user selection. In our example embodiment, the expressions "tea" 322A, "milk" 322B and "honey" 322C may have been recognized prior to the location-dependent search, and the location-dependent search is only performed for "honey" 322C after the user selection 410.

FIG. 4B also illustrates an example embodiment, wherein the one or more memories 220 and the computer program code 222 are configured to, with the one or more processors 212, cause the mobile apparatus 100 further to recognize each expression 322A, 322B, 322C within the string 320 by identifying a list type of structure comprising expressions separated by predefined characters comprising at least one of a space, a comma, a punctuation mark, a predefined character, a predefined symbol. In our example embodiment, the comma is used as the list separator. Also the "and" word may be recognized as a separator in this list, but in our example embodiment we have presumed that the word "toast" is not recognized and therefore not marked.

Figure 4C:
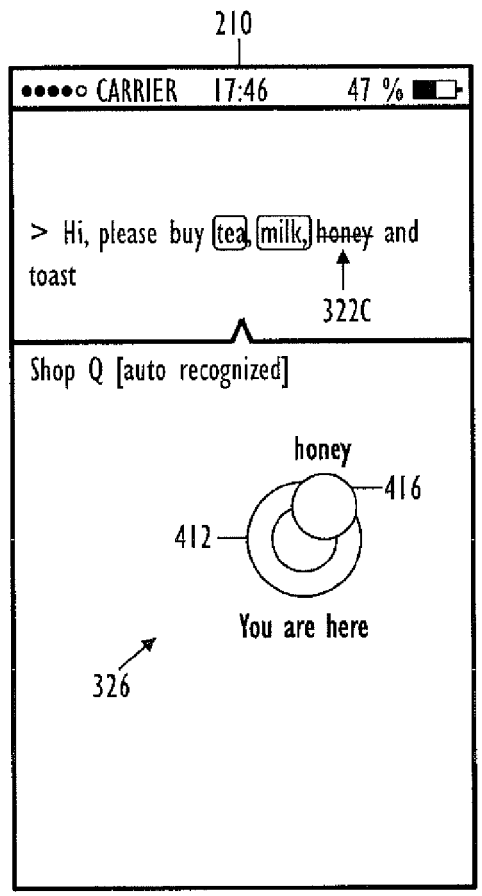

FIG. 4C illustrates an example embodiment, wherein the one or more memories 220 and the computer program code 222 are configured to, with the one or more processors 212, cause the mobile apparatus 100 further to receive a user interaction (such as swiping, tapping, or other suitable gesture supported by the user interface 208) in relation to the expression 322C, and display the string 320 such that the expression 322C is marked as processed within the string 320. In our example embodiment, the expression "honey" 322C is struck-out, but, naturally, other ways of marking the expression 322C as processed may also be utilized.

Figure 4D:
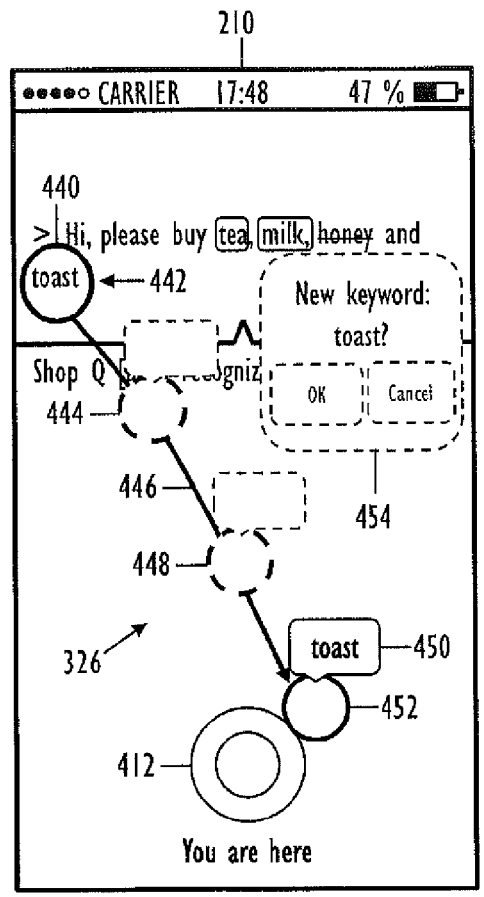

FIG. 4D illustrates an example embodiment, wherein the one or more memories 220 and the computer program code 222 are configured to, with the one or more processors 212, cause the mobile apparatus 100 further, after obtaining the string 320, to receive a user selection 440 of the one or more independent expressions 442, displayed on the display 210, and perform the location-based search on the basis of the user selection 440. In our example embodiment, the expression "toast" 442 has not been recognized, and for this reason the user selects 440 this word.

FIG. 4D illustrates an example embodiment, wherein the one or more memories 220 and the computer program code 222 are configured to, with the one or more processors 212, cause the mobile apparatus 100 further, if the location-based search does not find any location-dependent data as the result, to receive a user interaction 440, 444, 446, 448 which determines a user-defined location 452 for the expression 442, and the user-defined location 452 is displayed on the map 326 as at least a part of the location-dependent data. As shown in FIG. 4D, a label "toast" 450 may also be displayed by the user-defined location 452. In an example embodiment, the expression 442 may be in a video, image, or audio file, whereby the file or a reference to the file may also be displayed by the user-defined location. In the future, the user of the mobile apparatus 100A, or users of other mobile apparatuses 100B, 100C, may watch or listen the file by clicking it by the user-defined location 452.

FIG. 4B also illustrates an example embodiment, wherein the one or more memories 220 and the computer program code 222 are configured to, with the one or more processors 212, cause the mobile apparatus 100 further to determine whether the expression 322C corresponds to a reference associated with a predetermined location, and if the expression 322C corresponds to the reference, display the location-dependent data in the predetermined location 416 on the map 326 on the display 210.

FIG. 4D also illustrates an example embodiment, wherein the one or more memories 220 and the computer program code 222 are configured to, with the one or more processors 212, cause the mobile apparatus 100 further to receive a user interaction 440, 444, 446, 448 which determines a user-defined location 452 for the expression 442, and the user-defined location 452 is displayed on the map 326 as at least a part of the location-dependent data.

In a further example embodiment, the one or more memories 220 and the computer program code 222 are configured to, with the one or more processors 212, cause the mobile apparatus 100 further, prior to receiving the user interaction 440, 444, 446, 448 to determine whether the expression 442 corresponds to a reference associated with a predetermined location, and if the expression 442 does not correspond to the reference, display a query 454 on the display 210, the query 454 asking to which user-defined location the expression 442 is associated, and receive the user interaction as a response to the query 454.

In a further example embodiment, the one or more memories 220 and the computer program code 222 are configured to, with the one or more processors 212, cause the mobile apparatus 100 further to receive the user interaction as a drag and drop operation 440, 444, 446, 448. It is to be noted that with this example embodiment, the previous example embodiment may be avoided, i.e., no query is necessary.

In a further example embodiment, the one or more memories 220 and the computer program code 222 are configured to, with the one or more processors 212, cause the mobile apparatus 100 further to transmit, with the wireless transceiver 204 or 206, information 122 about the expression 442 and the associated user-defined location 452 to the external electronic service 112, which gathers and maintains the information in a crowd-sourcing manner, and distributes the information about the expression 442 and the associated user-defined location 452 to other mobile apparatuses 100B, 100C. In an example embodiment, there may be restrictions (possibly user-defined), which limit the group of the other mobile apparatuses 100B, 100C permitted to receive the information gathered in the crowd-sourcing manner.

In an example embodiment, the one or more memories 220 and the computer program code 222 are configured to, with the one or more processors 212, cause the mobile apparatus 100 further to allow the user interaction 440, 444, 446, 448, which determines the user-defined location 452 for the expression 442, even if the location-based search finds the location-dependent data as the result, in order to improve the accuracy of the user-defined location. In our example embodiment, the location for the "toast" may be improved as a number of users are allowed to determine its user-defined location 452. The user-defined location 452 may then be calibrated statistically. Additionally, or alternatively, each user-defined location 452 may be subjected to a social moderation: the users may give feedback on the accuracy of the user-defined location (by giving thumbs up or thumbs down, for example) on the map 326.

In an example embodiment, the mobile apparatus 100 further comprises a digital camera, and the one or more memories 220 and the computer program code 222 are configured to, with the one or more processors 212, cause the mobile apparatus 100 further to receive a picture of the product or its machine-readable identifier (such as a barcode), and to associate the picture or auxiliary information obtained on the basis of the machine-readable identifier, and, possibly, to transmit the picture or auxiliary information to the external electronic service 112 as a part of the information 122 about the expression 442. In our example, a picture of the "toast" or auxiliary information (brand, weight, price etc.) obtained about the "toast" may thus be gathered by the user.

FIGS. 5A, 5B, 5C, 5D, 5E and 5F illustrate an example embodiment related to a visit to a cafe.

Figure 5A:
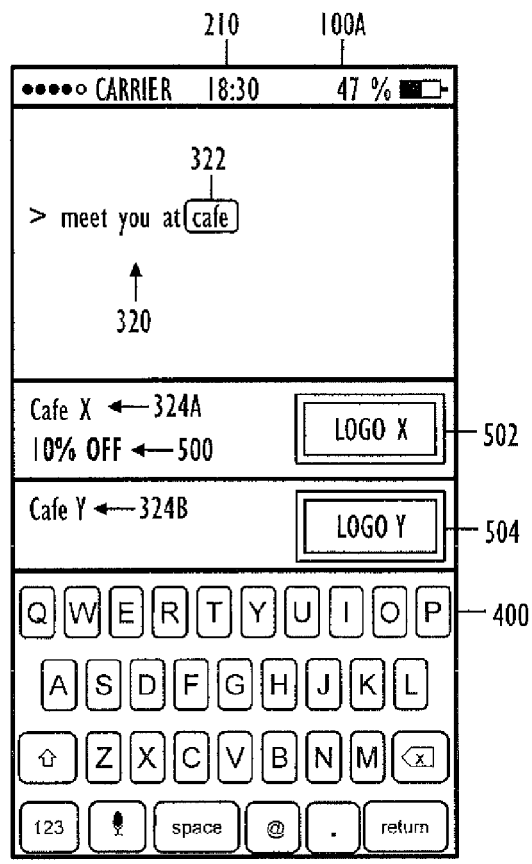

In FIG. 5A, an invitation (=string) 320 is received by the messaging component in the mobile apparatus 100A. A virtual keyboard 400 is also visible for possible user interaction. The expression "cafe" 322 has been recognized within the string 320.

The location-based search has produced two results "Cafe X" 324A and "Cafe Y" 324B as the location-dependent data, which is relevant within a predetermined distance from the own location of the mobile apparatus 100A. The location-dependent data 324 also includes further elements: logos 502, 504 of two cafes, and a 10% discount offer 500 for the Cafe X.

In an example embodiment, the one or more memories 220 and the computer program code 222 are configured to, with the one or more processors 212, cause the mobile apparatus 100 further to generate a dummy result as a part of the location-dependent data, the dummy result comprising the independent expression 322. The dummy result may be displayed even if real results are also found. In our example embodiment, the dummy result "cafe" may be displayed below the two results "Cafe X" 324A and "Cafe Y" 324B. In an example embodiment, the one or more memories 220 and the computer program code 222 are configured to, with the one or more processors 212, cause the mobile apparatus 100 further to receive a user interaction for the dummy result, which determines a user-defined location for the expression 322, and the user-defined location is displayed on the map 326 as at least a part of the location-dependent data. In a further example embodiment, the one or more memories 220 and the computer program code 222 are configured to, with the one or more processors 212, cause the mobile apparatus 100 further to receive the user interaction for the dummy result as a drag and drop operation (similar to that 440, 444, 446, 448 disclosed in FIG. 4D).

Figure 5B:
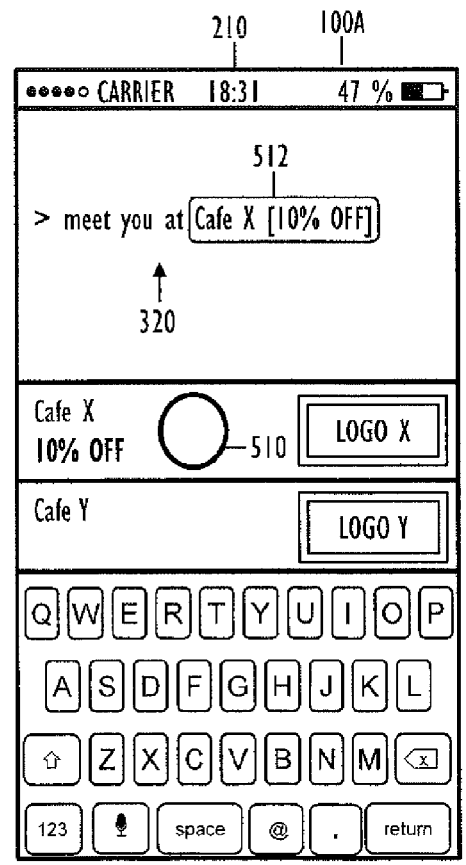

FIG. 5B illustrates an example embodiment wherein the one or more memories 220 and the computer program code 222 are configured to, with the one or more processors 212, cause the mobile apparatus 100 further to replace one or more independent expressions 322 with the location-dependent data 324A, 500 in the string 320 displayed on the display 210. In our example embodiment "cafe" is replaced with "Cafe X [10% OFF]". In an example embodiment, the location dependent data 324A, 500 includes targeted advertising, i.e., an advert targeted on the basis of some selection criteria (location, time of day, day of week, gender, age etc.)

FIG. 5B further illustrates an example embodiment wherein the one or more memories 220 and the computer program code 222 are configured to, with the one or more processors 212, cause the mobile apparatus 100 further to replace 512 the one or more independent expressions 322 with the location-dependent data 324A, 500 in the string 320 displayed on the display 210 such that the location-dependent data comprises a plurality of alternatives 324A/324B, and based on a user selection 510 one or more of the alternatives 324A are selected and replaced 512. In our example embodiment, the user selects Cafe X, which then replaces "cafe".

In an example embodiment, the one or more memories 220 and the computer program code 222 are configured to, with the one or more processors 212, cause the mobile apparatus 100 further to embed additional data 500 as a part of location-dependent data while replacing the one or more independent expressions 322 with the location-dependent data. In an example embodiment, the additional data comprises at least one of a link to a location in a network, a link to a file, a link to an action in a social media, an uniform resource identifier (URI, such as a uniform resource locator URL, and/or a uniform resource name URN). In our example embodiment, the additional data is a link (either to a file or to a storage location in a network) to a discount coupon.

Figure 5C:
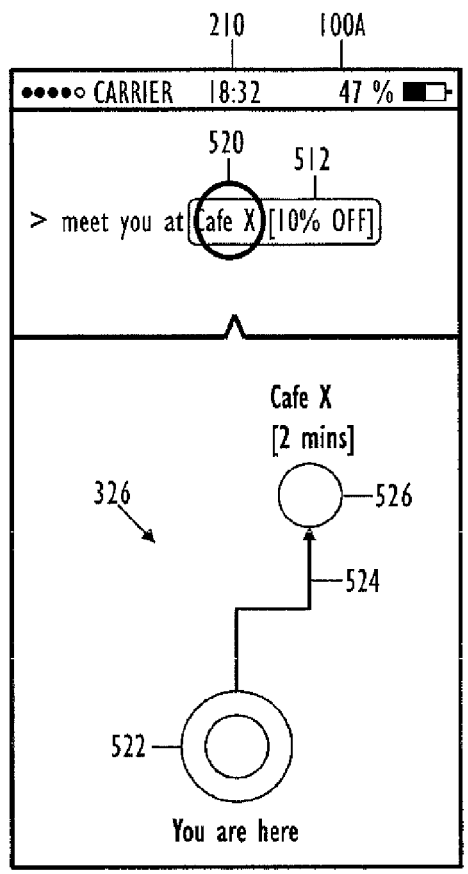

In FIG. 5C, the user selects 520 the replaced expression 512, whereupon an own location 522 of the user, a location 526 of the Cafe X, and a route 524 from the own location 522 to the location 526 of the Cafe X are shown on the map 326. Furthermore, based on the location dependent data 324A, a travel time, two minutes, is shown by the destination, thereby displaying at least a part of the location-dependent data 324A on the map 326 on the display 210. As can be understood, obtaining the string 322, performing the location-based search, displaying the location-dependent data 324A, 324B, 500, 502, 504, and displaying at least a part of the location-dependent data 324A on the map 326, are not necessarily all processed while remaining in the same display mode: in our example embodiment, the display modes of FIGS. 5A, 5B and 5C follow each other sequentially.

Figure 5D:
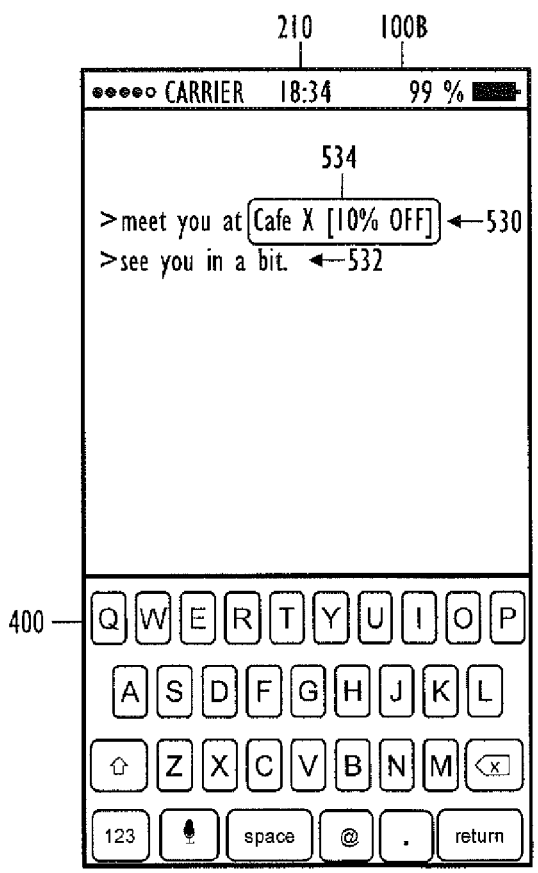

FIG. 5D illustrates an example embodiment wherein the one or more memories 220 and the computer program code 222 are configured to, with the one or more processors 212, cause the mobile apparatus 100 further to transmit, with the wireless transceiver 204 or 206, the string 320 containing the one or more expressions 322 replaced 512 with the location-dependent data 324A, 500 to another mobile apparatus 1008. In our example embodiment, the other mobile apparatus 100B shows on its display 210, the received string 530, from which the expression 534 is identified, whereupon the user of the other mobile apparatus 100B types with the keyboard 400 a response 532 to the user of mobile apparatus 100A. In this example embodiment, the user of the mobile apparatus 100A shares the selected Cafe X with the user of the other mobile apparatus 100B. In this way, the combined messaging and the search result in an invitation/recommendation.

Figure 5E:
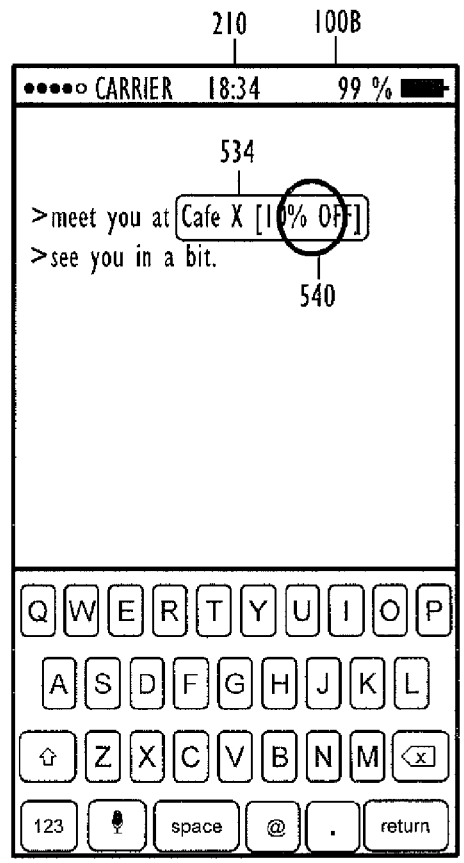
Figure 5F:

In FIG. 5E, the user selects 540 the expression 534, whereupon, as illustrated in FIG. 5F, a discount coupon, as a part of the location-dependent data 324A, is displayed on the display 210 of the other mobile apparatus 100B. In our example embodiment, the user has selected 550 the discount coupon with a barcode 556. The other alternative 552 uses a QR-code. Naturally, other ways of presenting the discount coupon may also be utilized (such as by RFID communication, for example). The discount coupon may also include the offer and shop details in clear text 554. The user may show the discount coupon at the counter of Cafe X while paying, whereupon the salesperson may machine-read the barcode 556 and give the 10% discount.

The example embodiments illustrated in FIGS. 5A, 5B, 5C, 5D, 5E and 5F may be augmented by a further example embodiment, wherein the one or more memories 220 and the computer program code 222 are configured to, with the one or more processors 212, cause the mobile apparatus 100 further, after obtaining the string 320, to process the string 320 as a beginning part of a word, and perform the location-based search in order to find the plurality of the alternatives, which match the beginning part of the word. Let us take a simple example. The user starts to write a word: "ca" on the display 210, whereupon this free-form text is obtained as the string 320. The own location of the mobile apparatus 100 is also obtained with the positioning interface 228. The location-based search for location-dependent data is performed on the basis of the own location and the independent expression "ca" within the string 320 such that the location-dependent data is relevant within a predetermined distance from the own location. The location-based search "guesses" what the user is likely to mean: "ca" is interpreted as either referring to "cafe", "car shop" and "cat food", and three separate location-based searches are performed, the first search for "cafe", the second search for "car shop", and the third search for "cat food". Note that the guesses may related to locations, but, alternative, or additionally, also to items (such as consumer goods including products and services). These results may be displayed as a list as in FIG. 5A, or, alternatively, on the map 326 as in FIG. 5C, for example. The replacement and transmission may then be performed as described before.

Figure 6A:
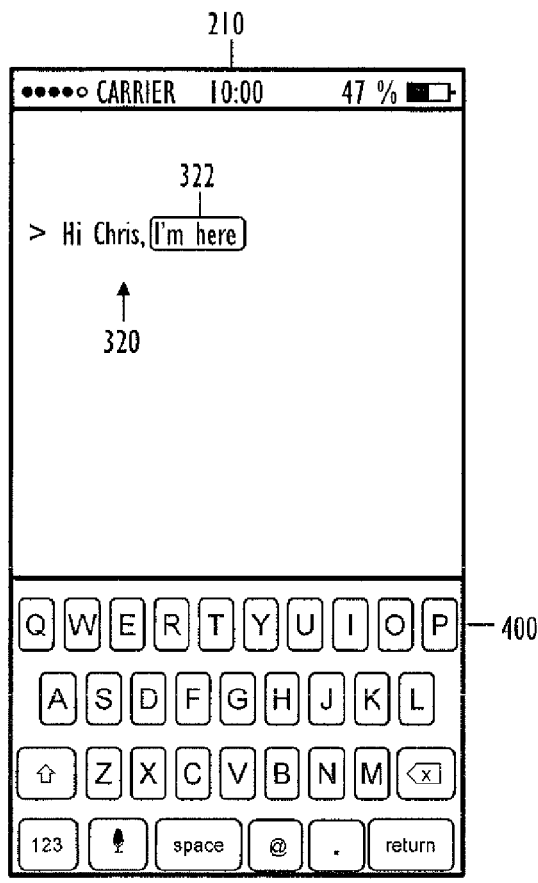
Figure 6B:
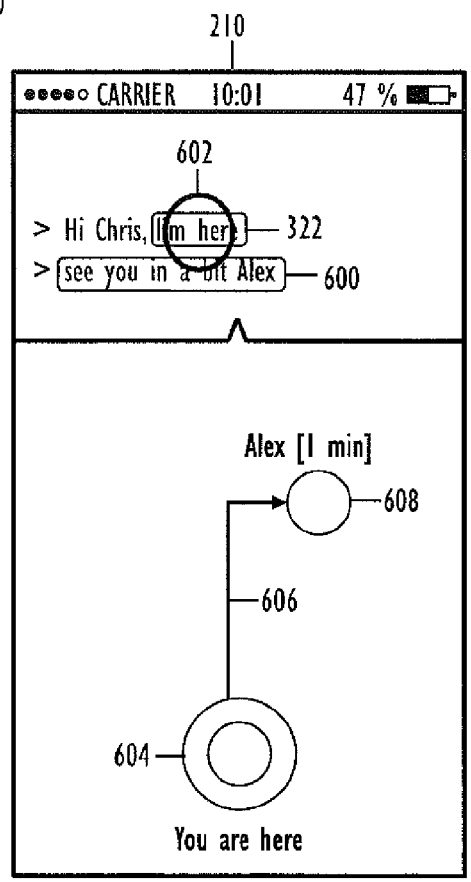

FIGS. 6A and 6B illustrate an example embodiment for sharing a location.

Alex shares his location by writing to Chris the string 320 "Hi Chris, I'm here", from which the expression 322 "I'm here" is recognized. FIG. 6A shows the mobile apparatus 100 of Chris.

In FIG. 6B, Chris replies with the string 600 "see you in a bit". Chris also taps 602 the expression 322 "I'm here", whereupon the own location 604 of Chris is shown, together with a location 608 of the Alex, and a suggested route 606 from Chris to Alex.

FIGS. 6A and 6B further illustrate a social aspect of buying. Let us suppose that the string 320 is "Hi Chris, I found great shoes here". Expression "here" is interpreted as referring to the user's location (which may then be obtained in the various ways described earlier). In this way, experiences may be shared between friends, augmented by location-based searches.

Figure 7:
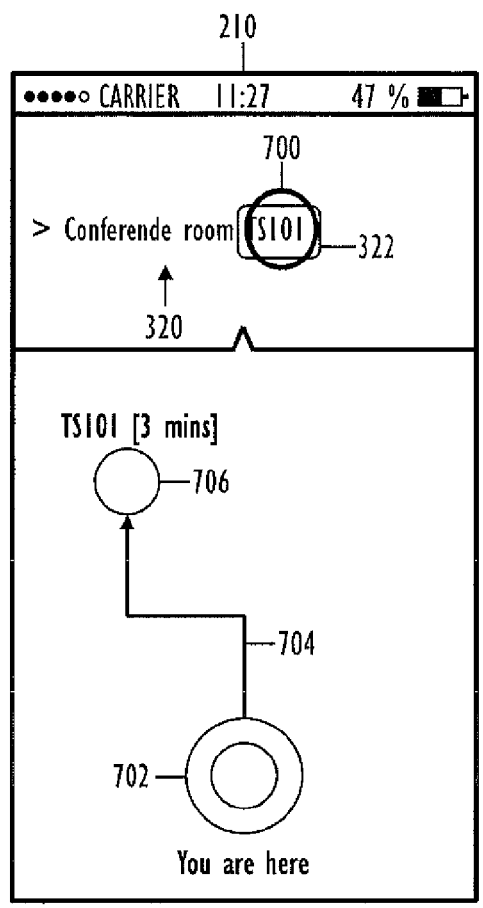
Figure 8:
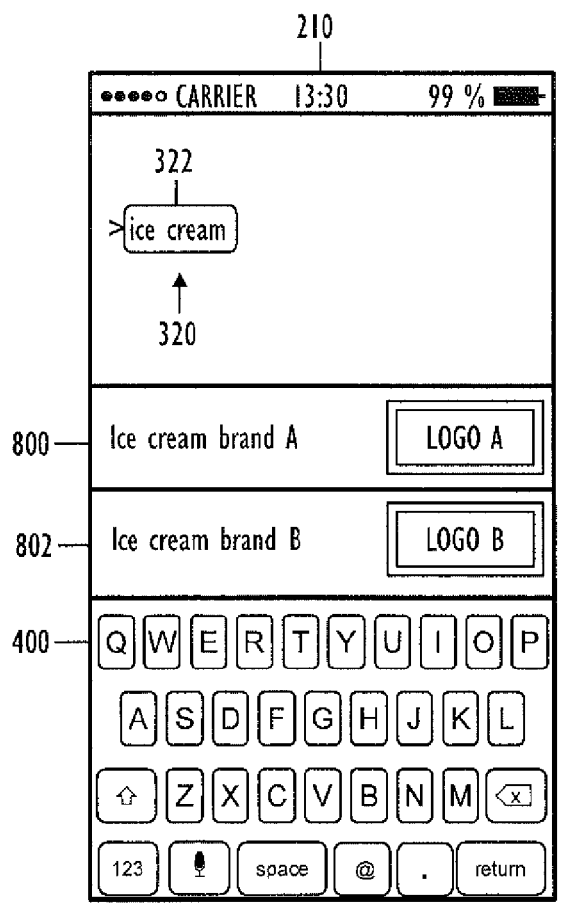

FIGS. 7, 8 and 9 illustrate example embodiments of a generic search.

In FIG. 7, the expression "TS101" 322 is recognized from the string 320 "Conference room TS101". The user taps 700 the expression 322, whereupon, the own location 702 of the user, together with a location 706 of the conference room and a route suggestion 704 are displayed on the display 210.

In FIG. 8, the user writes the string 320 from which the expression 322 "ice cream" is recognized, whereupon two results 800, 802, are displayed on the display 210. In an example embodiment, the results 800, 802 are promoted, by a shop, importer, manufacturer, or some other party interested in the success of the promoted products 800, 802.

In FIG. 9, the user receives the string 320 from which the expression 322 "gate 34" is recognized. The user writes a response string 900 with the expression 902. Finally, the user taps 904 the expression 322, whereupon, the own location 906 of the user, together with a location 910 of the gate 34 and a route suggestion 908 are displayed on the display 210.

Next, let us study FIG. 10 illustrating a method performed in the mobile apparatus 100. The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method starts in 1000 as the mobile apparatus 100 is switched on and it starts to process a string.

In 1002, a string is obtained.

In 1004, a location associated with the string is obtained.

In 1006, a location-based search for location-dependent data is performed on the basis of the location and one or more independent expressions within the string such that the location-dependent data is relevant within a predetermined distance from the location.

In 1008, at least a park of the location-dependent data is displayed on a map.

The method ends in 1010 if the mobile apparatus 100 is switched off, or the method may also be suspended after all pending strings are processed until the next not yet processed string is obtained.

The already described example embodiments of the mobile apparatus 100 may be utilized to enhance the method with various further example embodiments.

It will be obvious to a person skilled in the art that, as technology advances, the inventive concept can be implemented in various ways. The invention and its embodiments are not limited to the example embodiments described above but may vary within the scope of the claims.

The invention claimed is:

1. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location; and
display at least a part of the location-dependent data on a map on the display,
wherein the mobile apparatus further comprises a wireless transceiver, and the one or more memories and the computer program code are configured to, with the one or more processors, cause the mobile apparatus further to:
obtain the string from free-form text communicated as a message with the wireless transceiver.

2. The mobile apparatus of claim 1, wherein the independent expressions are independent such that each expression causes an own location-based search.

3. The mobile apparatus of claim 2, wherein the one or more memories and the computer program code are configured to, with the one or more processors, cause the mobile apparatus further to:
display the location-dependent data on the map on the display such that for each location-based search the location-dependent data is displayed by one of displaying the location-dependent data simultaneously for each location-based search, displaying the location-dependent data for each location-based search as selected by a user interaction.

4. The mobile apparatus of claim 1, wherein the mobile apparatus further comprises a positioning interface, the one or more memories and the computer program code are configured to, with the one or more processors, cause the mobile apparatus further to:
obtain, with the positioning interface an own location of the mobile apparatus as the location.

5. The mobile apparatus of claim 4, wherein the positioning interface comprises an interface to an indoor positioning system.

6. The mobile apparatus of claim 4, wherein the one or more memories and the computer program code are configured to, with the one or more processors, cause the mobile apparatus further to:
obtain at least one other location of at least one other mobile apparatus; and
generate the location associated with the string on the basis of the own location and the at least one other location.

7. The mobile apparatus of claim 6, wherein the one or more memories and the computer program code are configured to, with the one or more processors, cause the mobile apparatus further to:
perform the location-based search by one of such that the location-dependent data is relevant within the predetermined distance from the own location or from the at least one other location, or such that the location-dependent data is relevant within the predetermined distance from a combined area defined by the own location and the at least one other location.

8. The mobile apparatus of claim 1, wherein the one or more memories and the computer program code are configured to, with the one or more processors, cause the mobile apparatus further to:
perform the location-based search such that the location-dependent data is associated with indoor locations comprising buildings.

9. The mobile apparatus of claim 1, wherein the one or more memories and the computer program code are configured to, with the one or more processors, cause the mobile apparatus further to:
obtain the string from free-form text displayed on the display.

10. The mobile apparatus of claim 9, wherein the one or more memories and the computer program code are configured to, with the one or more processors, cause the mobile apparatus further to:
obtain the location associated with the string from the free-form text.

11. The mobile apparatus of claim 1, wherein the one or more memories and the computer program code are configured to, with the one or more processors, cause the mobile apparatus further to:
obtain the string from free-form text displayed in a messaging interface on the display.

12. The mobile apparatus of claim 11, wherein the one or more memories and the computer program code are configured to, with the one or more processors, cause the mobile apparatus further to:
obtain a location of another mobile apparatus, which is either a sender or a recipient in the messaging interface, as the location associated with the string.

13. The mobile apparatus of claim 11, wherein the messaging interface simultaneously acts as a search interface, such that the combined messaging and search interface is displayed on the display.

14. The mobile apparatus of claim 1, wherein the one or more memories and the computer program code are configured to, with the one or more processors, cause the mobile apparatus further to:
obtain a location of another mobile apparatus, being either a sender or a recipient in the message, as the location associated with the string.

15. The mobile apparatus of claim 1, wherein the one or more memories and the computer program code are configured to, with the one or more processors, cause the mobile apparatus further to:
obtain at least one location of at least one other mobile apparatus as the location associated with the string.

16. The mobile apparatus of claim 1, wherein the one or more memories and the computer program code are configured to, with the one or more processors, cause the mobile apparatus further to:
obtain the string from free-form text mined from at least one of the following residing in the memory: a text file, an image file, a video file, an audio file, a reference to a text file, a reference to an image file, a reference to a video file, a reference to an audio file.

17. The mobile apparatus of claim 1, wherein the string comprises at least one of the following elements residing in the memory: an image file, a video file, an audio file, a reference to an image file, a reference to a video file, a reference to an audio file, and the one or more memories and the computer program code are configured to, with the one or more processors, cause the mobile apparatus further to:

recognize one or more digital objects within the one or more elements as the independent expressions; and
perform the location-based search such that a pattern recognition search for the one or more digital objects forms at least a part of the location-based search.

18. The mobile apparatus of claim 1, wherein the one or more memories and the computer program code are configured to, with the one or more processors, cause the mobile apparatus further to:
after obtaining the string, recognize automatically the one or more independent expressions within the string.

19. The mobile apparatus of claim 18, wherein the one or more memories and the computer program code are configured to, with the one or more processors, cause the mobile apparatus further to:
recognize automatically the one or more independent expressions within the string before performing the location-based search.

20. The mobile apparatus of claim 18, wherein the one or more memories and the computer program code are configured to, with the one or more processors, cause the mobile apparatus further to:
recognize automatically the one or more independent expressions within the string as a part of the location-based search.

21. The mobile apparatus of claim 18, wherein the one or more memories and the computer program code are configured to, with the one or more processors, cause the mobile apparatus further to:
after recognizing the one or more expressions within the string, display the string such that the one or more independent expressions become distinguishable within the string.

22. The mobile apparatus of claim 18, wherein the one or more memories and the computer program code are configured to, with the one or more processors, cause the mobile apparatus further to:
after displaying the string such that the one or more independent expressions become distinguishable within the string, receive a user selection of at least one of the one or more independent expressions, and perform the location-based search on the basis of the user selection.

23. The mobile apparatus of claim 1, wherein the one or more memories and the computer program code are configured to, with the one or more processors, cause the mobile apparatus further to:
receive a user interaction in relation to the expression, and display the string such that the expression is marked as processed within the string.

24. The mobile apparatus of claim 1, wherein the one or more memories and the computer program code are configured to, with the one or more processors, cause the mobile apparatus further to:
after obtaining the string, receive a user selection of the one or more independent expressions displayed on the display, and perform the location-based search on the basis of the user selection.

25. The mobile apparatus of claim 24, wherein the one or more memories and the computer program code are configured to, with the one or more processors, cause the mobile apparatus further to:
if the location-based search does not find any location-dependent data as the result, receive a user interaction, which determines a user-defined location for the expression, and the user-defined location is displayed on the map as at least a part of the location-dependent data.

26. The mobile apparatus of claim 1, wherein the mobile apparatus further comprises a wireless transceiver, and the one or more memories and the computer program code are configured to, with the one or more processors, cause the mobile apparatus further to:
perform at least a part of the location-based search by communicating with an external electronic service through the wireless transceiver.

27. The mobile apparatus of claim 1, wherein the one or more memories and the computer program code are configured to, with the one or more processors, cause the mobile apparatus further to:
perform at least a part of the location-based search by interacting with a database stored in the memory.

28. The mobile apparatus of claim 1, wherein the one or more memories and the computer program code are configured to, with the one or more processors, cause the mobile apparatus further to:
replace one or more independent expressions with the location-dependent data in the string displayed on the display.

29. The mobile apparatus of claim 28, wherein the one or more memories and the computer program code are configured to, with the one or more processors, cause the mobile apparatus further to:
replace the one or more independent expressions with the location-dependent data in the string displayed on the display such that the location-dependent data comprises a plurality of alternatives, and based on a user selection one or more of the alternatives are selected and replaced.

30. The mobile apparatus of claim 29, wherein the one or more memories and the computer program code are configured to, with the one or more processors, cause the mobile apparatus further to:
after obtaining the string, process the string as a beginning part of a word, and perform the location-based search in order to find the plurality of the alternatives, which match the beginning part of the word.

31. The mobile apparatus of claim 28, wherein the mobile apparatus further comprises a wireless transceiver, and the one or more memories and the computer program code are configured to, with the one or more processors, cause the mobile apparatus further to:
transmit, with the wireless transceiver, the string containing the one or more expressions replaced with the location-dependent data to another mobile apparatus.

32. The mobile apparatus of claim 28, wherein the mobile apparatus further comprises a wireless transceiver, and the one or more memories and the computer program code are configured to, with the one or more processors, cause the mobile apparatus further to:
embed additional data as a part of location-dependent data while replacing the one or more independent expressions with the location-dependent data.

33. The mobile apparatus of claim 32, wherein the additional data comprises at least one of a link to a location in a network, a link to a file, a link to an action in a social media, an uniform resource identifier.

34. The mobile apparatus of claim 1, wherein the one or more memories and the computer program code are configured to, with the one or more processors, cause the mobile apparatus further to:

display the location-dependent data relating to the expression on the map and the expression simultaneously on the display.

35. The mobile apparatus of claim 1, wherein the expression comprises one or more words, which are selected from a predetermined vocabulary.

36. The mobile apparatus of claim 1, wherein the mobile apparatus further comprises a database, which comprises expression-data -pairs, and the one or more memories and the computer program code are configured to, with the one or more processors, cause the mobile apparatus further to:
perform the location-based search by searching the database iteratively with each expression.

37. The mobile apparatus of claim 1, wherein the one or more memories and the computer program code are configured to, with the one or more processors, cause the mobile apparatus further to:
recognize each expression within the string by identifying a list type of structure comprising expressions separated by predefined characters comprising at least one of a space, a comma, a punctuation mark, a predetermined character, a predetermined symbol.

38. The mobile apparatus of claim 1, wherein the one or more memories and the computer program code are configured to, with the one or more processors, cause the mobile apparatus further to:
determine whether the expression corresponds to a reference associated with a predetermined location; and
if the expression corresponds to the reference, display the location-dependent data in the predetermined location on the map on the display.

39. The mobile apparatus of claim 1, wherein the one or more memories and the computer program code are configured to, with the one or more processors, cause the mobile apparatus further to:
receive a user interaction, which determines a user-defined location for the expression, and the user-defined location is displayed on the map as at least a part of the location-dependent data.

40. The mobile apparatus of claim 39, wherein the one or more memories and the computer program code are configured to, with the one or more processors, cause the mobile apparatus further to:
prior to receiving the user interaction, determine whether the expression corresponds to a reference associated with a predetermined location; and
if the expression does not correspond to the reference, display a query on the display, the query asking to which user-defined location the expression is associated; and
receive the user interaction as a response to the query.

41. The mobile apparatus of claim 39, wherein the one or more memories and the computer program code are configured to, with the one or more processors, cause the mobile apparatus further to:
receive the user interaction as a drag and drop operation.

42. The mobile apparatus of claim 39, wherein the mobile apparatus further comprises a wireless transceiver, and the one or more memories and the computer program code are configured to, with the one or more processors, cause the mobile apparatus further to:
transmit, with the wireless transceiver, information about the expression and the associated user-defined location to an external electronic service, which gathers and maintains the information in a crowd-sourcing manner, and distributes the information about the expression and the associated user-defined location to other mobile apparatuses.

43. The mobile apparatus of claim 1, wherein the one or more memories and the computer program code are configured to, with the one or more processors, cause the mobile apparatus further to:
display the location on the map on the display; and
display a route between the location and another location defined by the location-dependent data on the map on the display.

44. The mobile apparatus of claim 1, wherein the mobile apparatus further comprises a database, whose contents are classified into location classes, and the one or more memories and the computer program code are configured to, with the one or more processors, cause the mobile apparatus further to:
select a subset of the database such that location classes correspond to the location; and
perform the location-based search for the subset of the database with the one or more independent expressions.

45. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location; and
display at least a part of the location-dependent data on a map,
wherein the mobile apparatus comprises a wireless transceiver, and the computer program code are configured to cause the mobile apparatus further to:
obtain the string from free-form text communicated as a message with the wireless transceiver.

46. A method in a mobile apparatus comprising:
obtaining a string;
obtaining a location associated with the string;
performing a location-based search for location-dependent data on the basis of the location and one or more independent expressions within the string such that the location-dependent data is relevant within a predetermined distance from the location; and
displaying at least a part of the location-dependent data on a map,
wherein the mobile apparatus comprises a wireless transceiver, and the computer program code are configured to cause the mobile apparatus further to:
obtain the string from free-form text communicated as a message with the wireless transceiver.

47. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display;
obtain at least one other location of at least one other mobile apparatus; and
generate the location associated with the string on the basis of the own location and the at least one other location.

48. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display;
obtain the string from free-form text displayed in a messaging interface on the display; and
obtain a location of another mobile apparatus, which is either a sender or a recipient in the messaging interface, as the location associated with the string.

49. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display; and
obtain the string from free-form text displayed in a messaging interface on the display,
wherein the messaging interface simultaneously acts as a search interface, such that the combined messaging and search interface is displayed on the display.

50. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display; and
obtain at least one location of at least one other mobile apparatus as the location associated with the string.

51. A mobile apparatus comprising:
a display;
one or more processors; and
one or more memories including computer program code;
the one or more memories and the computer program code configured to, with the one or more processors, cause the mobile apparatus at least to:
obtain a string, the string comprises at least one of the following elements residing in the memory: an image file, a video file, an audio file, a reference to an image file, a reference to a video file, a reference to an audio file;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display;
recognize one or more digital objects within the one or more elements as the independent expressions; and
perform the location-based search such that a pattern recognition search for the one or more digital objects forms at least a part of the location-based search.

52. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display;
after obtaining the string, recognize automatically the one or more independent expressions within the string; and
after recognizing the one or more expressions within the string, display the string such that the one or more independent expressions become distinguishable within the string.

53. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display;
after obtaining the string, recognize automatically the one or more independent expressions within the string; and after displaying the string such that the one or more independent expressions become distinguishable within the string, receive a user selection of at least one of the one or more independent expressions, and perform the location-based search on the basis of the user selection.

54. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display; and
after obtaining the string, receive a user selection of the one or more independent expressions displayed on the display, and perform the location-based search on the basis of the user selection; and
if the location-based search does not find any location-dependent data as the result, receive a user interaction, which determines a user-defined location for the expression, and the user-defined location is displayed on the map as at least a part of the location-dependent data.

55. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display; and
replace one or more independent expressions with the location-dependent data in the string displayed on the display.

56. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display;

receive a user interaction, which determines a user-defined location for the expression, and the user-defined location is displayed on the map as at least a part of the location-dependent data;
prior to receiving the user interaction, determine whether the expression corresponds to a reference associated with a predetermined location; and
if the expression does not correspond to the reference, display a query on the display, the query asking to which user-defined location the expression is associated; and
receive the user interaction as a response to the query.

57. A mobile apparatus comprising:
a display;
one or more processors; and
one or more memories including computer program code;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display;
receive a user interaction, which determines a user-defined location for the expression, and the user-defined location is displayed on the map as at least a part of the location-dependent data; and
transmit, with the wireless transceiver, information about the expression and the associated user-defined location to an external electronic service, which gathers and maintains the information in a crowd-sourcing manner, and distributes the information about the expression and the associated user-defined location to other mobile apparatuses.

58. A mobile apparatus comprising:
a display;
one or more processors; and
one or more memories including computer program code;
a database, whose contents are classified into location classes;
the one or more memories and the computer program code configured to, with the one or more processors, cause the mobile apparatus at least to:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map on the display;
select a subset of the database such that location classes correspond to the location; and
perform the location-based search for the subset of the database with the one or more independent expressions.

59. A non-transitory computer-readable storage medium comprising a computer program comprising computer program code which, when loaded into a mobile apparatus causes the mobile apparatus to perform:
obtain a string;
obtain a location associated with the string;

perform a location-based search for location-dependent data on the basis of the location and one or more independent expressions within the string such that the location-dependent data is relevant within a predetermined distance from the location;
display at least a part of the location-dependent data on a map;
obtain at least one other location of at least one other mobile apparatus; and
generate the location associated with the string on the basis of the own location and the at least one other location.

60. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map;
obtain the string from free-form text displayed in a messaging interface on the display; and
obtain a location of another mobile apparatus, which is either a sender or a recipient in the messaging interface, as the location associated with the string.

61. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map; and
obtain the string from free-form text displayed in a messaging interface on the display,
wherein the messaging interface simultaneously acts as a search interface, such that the combined messaging and search interface is displayed on the display.

62. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map; and
obtain at least one location of at least one other mobile apparatus as the location associated with the string.

63. A non-transitory computer-readable storage medium comprising a computer program comprising computer program code which, when loaded into a mobile apparatus causes the mobile apparatus to perform:
obtain a string, the string comprises at least one of the following elements: an image file, a video file, an audio file, a reference to an image file, a reference to a video file, a reference to an audio file;
obtain a location associated with the string;
perform a location-based search for location-dependent data on the basis of the location and one or more independent expressions within the string such that the location-dependent data is relevant within a predetermined distance from the location;
display at least a part of the location-dependent data on a map;
recognize one or more digital objects within the one or more elements as the independent expressions; and
perform the location-based search such that a pattern recognition search for the one or more digital objects forms at least a part of the location-based search.

64. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map;
after obtaining the string, recognize automatically the one or more independent expressions within the string; and
after recognizing the one or more expressions within the string, display the string such that the one or more independent expressions become distinguishable within the string.

65. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map;
after obtaining the string, recognize automatically the one or more independent expressions within the string; and
after displaying the string such that the one or more independent expressions become distinguishable within the string, receive a user selection of at least one of the one or more independent expressions, and perform the location-based search on the basis of the user selection.

66. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map;
after obtaining the string, receive a user selection of the one or more independent expressions displayed on the display, and perform the location-based search on the basis of the user selection; and
if the location-based search does not find any location-dependent data as the result, receive a user interaction, which determines a user-defined location for the expression, and the user-defined location is displayed on the map as at least a part of the location-dependent data.

67. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map; and
replace one or more independent expressions with the location-dependent data in the string displayed on the display.

68. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map;
receive a user interaction, which determines a user-defined location for the expression, and the user-defined location is displayed on the map as at least a part of the location-dependent data;
prior to receiving the user interaction, determine whether the expression corresponds to a reference associated with a predetermined location;
if the expression does not correspond to the reference, display a query on the display, the query asking to which user-defined location the expression is associated; and
receive the user interaction as a response to the query.

69. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map;
receive a user interaction, which determines a user-defined location for the expression, and the user-defined location is displayed on the map as at least a part of the location-dependent data; and
transmit information about the expression and the associated user-defined location to an external electronic service, which gathers and maintains the information in a crowd-sourcing manner, and distributes the information about the expression and the associated user-defined location to other mobile apparatuses.

70. A non-transitory computer-readable storage medium comprising a computer program comprising computer program code which, when loaded into a mobile apparatus causes the mobile apparatus to perform:
obtain a string;
obtain a location associated with the string;
perform a location-based search for location-dependent data on the basis of the location and one or more independent expressions within the string such that the location-dependent data is relevant within a predetermined distance from the location;
display at least a part of the location-dependent data on a map,
wherein the mobile apparatus further comprises a database, whose contents are classified into location classes, and the computer program code are configured to cause the mobile apparatus further to:
select a subset of the database such that location classes correspond to the location; and
perform the location-based search for the subset of the database with the one or more independent expressions.

71. A method in a mobile apparatus comprising:
obtaining a string;
obtaining a location associated with the string;
performing a location-based search for location-dependent data on the basis of the location and one or more independent expressions within the string such that the location-dependent data is relevant within a predetermined distance from the location;
displaying at least a part of the location-dependent data on a map;
obtaining at least one other location of at least one other mobile apparatus; and
generating the location associated with the string on the basis of the own location and the at least one other location.

72. A method in a mobile apparatus comprising:
obtaining a string;
obtaining a location associated with the string;
performing a location-based search for location-dependent data on the basis of the location and one or more independent expressions within the string such that the location-dependent data is relevant within a predetermined distance from the location;
displaying at least a part of the location-dependent data on a map;
obtaining the string from free-form text displayed in a messaging interface; and
obtaining a location of another mobile apparatus, which is either a sender or a recipient in the messaging interface, as the location associated with the string.

73. A method in a mobile apparatus comprising:
obtaining a string;
obtaining a location associated with the string;

performing a location-based search for location-dependent data on the basis of the location and one or more independent expressions within the string such that the location-dependent data is relevant within a predetermined distance from the location;
displaying at least a part of the location-dependent data on a map; and
obtaining the string from free-form text displayed in a messaging interface,
wherein the messaging interface simultaneously acts as a search interface, such that the combined messaging and search interface are displayed.

74. A method in a mobile apparatus comprising:
obtaining a string;
obtaining a location associated with the string;
performing a location-based search for location-dependent data on the basis of the location and one or more independent expressions within the string such that the location-dependent data is relevant within a predetermined distance from the location;
displaying at least a part of the location-dependent data on a map; and
obtaining at least one location of at least one other mobile apparatus as the location associated with the string.

75. A method in a mobile apparatus comprising:
obtaining a string the string comprises at least one of the following elements: an image file, a video file, an audio file, a reference to an image file, a reference to a video file, and a reference to an audio file;
obtaining a location associated with the string;
performing a location-based search for location-dependent data on the basis of the location and one or more independent expressions within the string such that the location-dependent data is relevant within a predetermined distance from the location;
displaying at least a part of the location-dependent data on a map;
recognizing one or more digital objects within the one or more elements as the independent expressions; and
performing the location-based search such that a pattern recognition search for the one or more digital objects forms at least a part of the location-based search.

76. A method in a mobile apparatus comprising:
obtaining a string;
obtaining a location associated with the string;
performing a location-based search for location-dependent data on the basis of the location and one or more independent expressions within the string such that the location-dependent data is relevant within a predetermined distance from the location;
displaying at least a part of the location-dependent data on a map;
after obtaining the string, recognizing automatically the one or more independent expressions within the string; and
after recognizing the one or more expressions within the string, displaying the string such that the one or more independent expressions become distinguishable within the string.

77. A method in a mobile apparatus comprising:
obtaining a string;
obtaining a location associated with the string;
performing a location-based search for location-dependent data on the basis of the location and one or more independent expressions within the string such that the location-dependent data is relevant within a predetermined distance from the location;
displaying at least a part of the location-dependent data on a map;
after obtaining the string, recognizing automatically the one or more independent expressions within the string; and
after displaying the string such that the one or more independent expressions become distinguishable within the string, receiving a user selection of at least one of the one or more independent expressions, and performing the location-based search on the basis of the user selection.

78. A method in a mobile apparatus comprising:
obtaining a string;
obtaining a location associated with the string;
performing a location-based search for location-dependent data on the basis of the location and one or more independent expressions within the string such that the location-dependent data is relevant within a predetermined distance from the location;
displaying at least a part of the location-dependent data on a map;
after obtaining the string, receiving a user selection of the one or more independent expressions displayed on the display, and perform the location-based search on the basis of the user selection; and
if the location-based search does not find any location-dependent data as the result, receiving a user interaction, which determines a user-defined location for the expression, and displaying the user-defined location on the map as at least a part of the location-dependent data.

79. A method in a mobile apparatus comprising:
obtaining a string;
obtaining a location associated with the string;
performing a location-based search for location-dependent data on the basis of the location and one or more independent expressions within the string such that the location-dependent data is relevant within a predetermined distance from the location;
displaying at least a part of the location-dependent data on a map; and
replacing one or more independent expressions with the location-dependent data in the string displayed on the display.

80. A method in a mobile apparatus comprising:
obtaining a string;
obtaining a location associated with the string;
performing a location-based search for location-dependent data on the basis of the location and one or more independent expressions within the string such that the location-dependent data is relevant within a predetermined distance from the location;
displaying at least a part of the location-dependent data on a map;
receiving a user interaction, which determines a user-defined location for the expression, and the user-defined location is displayed on the map as at least a part of the location-dependent data;
prior to receiving the user interaction, determining whether the expression corresponds to a reference associated with a predetermined location;
if the expression does not correspond to the reference, displaying a query, the query asking to which user-defined location the expression is associated; and
receiving the user interaction as a response to the query.

81. A method in a mobile apparatus comprising:
obtaining a string;
obtaining a location associated with the string;

performing a location-based search for location-dependent data on the basis of the location and one or more independent expressions within the string such that the location-dependent data is relevant within a predetermined distance from the location;

displaying at least a part of the location-dependent data on a map;

receiving a user interaction, which determines a user-defined location for the expression, and the user-defined location is displayed on the map as at least a part of the location-dependent data; and transmiting information about the expression and the associated user-defined location to an external electronic service, which gathers and maintains the information in a crowd-sourcing manner, and distributes the information about the expression and the associated user-defined location to other mobile apparatuses.

82. A method in a mobile apparatus, the mobile apparatus comprises a database, whose contents are classified into location classes, comprising:

obtaining a string;

obtaining a location associated with the string;

performing a location-based search for location-dependent data on the basis of the location and one or more independent expressions within the string such that the location-dependent data is relevant within a predetermined distance from the location;

displaying at least a part of the location-dependent data on a map;

selecting a subset of the database such that location classes correspond to the location; and performing the location-based search for the subset of the database with the one or more independent expressions.

* * * * *